US012075916B2

(12) United States Patent
Newkirk et al.

(10) Patent No.: US 12,075,916 B2
(45) Date of Patent: Sep. 3, 2024

(54) MATTRESS FUNCTION INDICATOR ON GRAPHICAL USER INTERFACE FOR BED

(71) Applicant: Hill-Rom Services, Inc., Batesville, IN (US)

(72) Inventors: David Newkirk, Lawrenceburg, IN (US); Brandon Fisk, Brookville, IN (US); Gregory Shannon, Indianapolis, IN (US); Scott Corbin, Sunman, IN (US); Rachel L. Williamson, Batesville, IN (US); John Goewert, Batesville, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 1185 days.

(21) Appl. No.: 16/842,013

(22) Filed: Apr. 7, 2020

(65) Prior Publication Data

US 2020/0323354 A1 Oct. 15, 2020

Related U.S. Application Data

(60) Provisional application No. 62/833,382, filed on Apr. 12, 2019.

(51) Int. Cl.
*A47C 27/08* (2006.01)
*A61G 7/057* (2006.01)

(52) U.S. Cl.
CPC .......... *A47C 27/082* (2013.01); *A47C 27/081* (2013.01); *A61G 7/057* (2013.01); *A61G 7/05769* (2013.01); *A61G 2203/12* (2013.01); *A61G 2203/20* (2013.01); *A61G 2203/46* (2013.01)

(58) Field of Classification Search
CPC ..... A47C 27/082; A47C 27/081; A47C 27/08; A47C 27/10; A61G 7/057; A61G 7/05769; A61G 7/05776; A61G 2203/12; A61G 2203/16; A61G 2203/20; A61G 2203/46
USPC ................. 5/713, 710, 706, 644, 654, 655.3
See application file for complete search history.

(56) References Cited

U.S. PATENT DOCUMENTS 6,211,856 B1 4/2001 Choi et al.
8,397,326 B2 * 3/2013 Lafleche ............ A61G 7/05776 5/713
8,413,271 B2 * 4/2013 Blanchard ............. A61G 7/001 5/173

(Continued)

FOREIGN PATENT DOCUMENTS

CN 1263616 A 8/2000
CN 2650249 Y 10/2004

(Continued)

*Primary Examiner* — Robert G Santos
(74) *Attorney, Agent, or Firm* — Price Heneveld LLP

(57) ABSTRACT

A patient support apparatus may include a mattress configured to receive a fluid from a pneumatic system, a graphical user interface, and a controller configured to control the pneumatic system and to communicate with the graphical user interface. The controller may control the graphical user interface to selectively display a home screen comprising a plurality of icons, the icons comprising a mattress function menu icon and a mattress function screen accessible via the mattress function menu icon. The mattress function screen may include at least one control input configured to activate a first state and a second state of the controller.

9 Claims, 10 Drawing Sheets

(56) References Cited

U.S. PATENT DOCUMENTS

| | | | | |
|---|---|---|---|---|
| 8,474,072 | B2 * | 7/2013 | O'Keefe | A61G 7/053 340/286.07 |
| 8,832,885 | B2 * | 9/2014 | Lafleche | A61G 7/05761 5/713 |
| 8,856,992 | B2 * | 10/2014 | Lafleche | A61G 7/05761 5/713 |
| 9,233,038 | B2 * | 1/2016 | Gibson | A61G 7/057 |
| 9,820,904 | B2 * | 11/2017 | Lafleche | A61H 9/0078 |
| 9,833,194 | B2 | 12/2017 | Hayes et al. | |
| 10,987,265 | B2 * | 4/2021 | Lafleche | A61H 9/0078 |
| 11,633,313 | B2 * | 4/2023 | Nahavandi | A61G 7/018 5/600 |
| 2006/0101581 | A1 * | 5/2006 | Blanchard | A61G 7/00 5/713 |
| 2011/0289691 | A1 * | 12/2011 | Lafleche | A47C 27/10 5/713 |
| 2011/0296623 | A1 * | 12/2011 | Lafleche | A61G 7/05776 5/713 |
| 2011/0296624 | A1 * | 12/2011 | Lafleche | A61G 7/05761 5/713 |
| 2012/0073054 | A1 | 3/2012 | O'Keefe et al. | |
| 2013/0061396 | A1 * | 3/2013 | Lafleche | A61H 23/04 5/706 |
| 2014/0059766 | A1 | 3/2014 | Gibson et al. | |
| 2015/0231006 | A1 | 8/2015 | Bhimavarapu et al. | |
| 2016/0140307 | A1 | 5/2016 | Brosnan et al. | |
| 2018/0071158 | A1 * | 3/2018 | Lafleche | A61G 7/05761 |
| 2018/0213942 | A1 | 8/2018 | Marquette et al. | |
| 2019/0008708 | A1 | 1/2019 | Moreno et al. | |
| 2020/0323354 | A1 * | 10/2020 | Newkirk | A61G 7/057 |
| 2021/0045948 | A1 * | 2/2021 | Nahavandi | A61G 7/0509 |
| 2023/0240921 | A1 * | 8/2023 | Nahavandi | A61G 7/005 5/600 |

FOREIGN PATENT DOCUMENTS

| | | | | |
|---|---|---|---|---|
| CN | 101083031 A | | 12/2007 | |
| CN | 101815491 A | | 8/2010 | |
| CN | 108960928 A | | 12/2018 | |
| CN | 208511375 U | | 2/2019 | |
| EP | 2485171 A2 | | 8/2012 | |
| EP | 3351229 A1 | | 7/2018 | |
| EP | 3721847 A1 | * | 10/2020 | A47C 27/082 |

* cited by examiner

MATTRESS FUNCTION INDICATOR ON GRAPHICAL USER INTERFACE FOR BED

CROSS-REFERENCE TO RELATED APPLICATION

This application claims priority to and the benefit under 35 U.S.C. § 119(e) of U.S. Provisional Application No. 62/833,382, filed on Apr. 12, 2019, entitled "MATTRESS FUNCTION INDICATOR ON GRAPHICAL USER INTERFACE FOR BED," the disclosure of which is hereby incorporated herein by reference in its entirety.

FIELD OF THE DISCLOSURE

The present disclosure generally relates to a patient support apparatus graphical user interface, and more specifically to a mattress function indicator for display on the graphical user interface configured to indicate a mattress function state.

SUMMARY OF THE DISCLOSURE

According to one aspect of the present disclosure, a patient support apparatus includes an actuator configured to selectively transfer a fluid, a mattress having a cavity configured to receive the fluid, a graphical user interface, and a controller configured to control the actuator and communicate with the graphical user interface. The controller controls the graphical user interface to selectively display a first screen including a menu section, the menu section including a plurality of icons, the icons including a function setting input and a second screen accessible via the function setting input, wherein the second screen includes at least one control selection input. In response to a first input to the at least one control selection input, the controller responds by enabling a control input at the first screen, wherein the control input is configured to control a setting of the actuator. In response to a second input to the at least one control selection input, the controller responds by controlling a suppression of the control input at the first screen.

According to another aspect of the present disclosure, a patient support apparatus includes a mattress configured to receive a fluid from a pneumatic system, a graphical user interface, and a controller configured to control the pneumatic system and to communicate with the graphical user interface. The controller controls the graphical user interface to selectively display a home screen including a plurality of icons, the icons including a mattress function menu icon and a mattress function screen accessible via the mattress function menu icon. The mattress function screen includes at least one control input configured to activate a first state and a second state of the controller. In the first state, the controller is configured to display and enable a user input at the home screen, wherein in response to the user input, the controller performs an instruction configured to adjust a setting of the pneumatic system. In the second state, the controller is configured to suppress the display of and disable the user input at the home screen.

According to another aspect of the present disclosure, a patient support apparatus includes a pneumatic system configured to control a transfer of a fluid, a mattress configured to receive the fluid, a graphical user interface configured to accept a user input, and a controller configured to control the pneumatic system to control the transfer of the fluid at a flow rate and to communicate with the graphical user interface. The controller controls the graphical user interface to selectively display a first screen including a first set of icons, a second screen including a second set of icons, and monitor the graphical user interface for the user input. In response to a predetermined amount of time elapsed following the user input, the controller controls the graphical user interface to display the second screen.

These and other features, advantages, and objects of the present invention will be further understood and appreciated by those skilled in the art by reference to the following specification, claims, and appended drawings.

DETAILED DESCRIPTION

Figure 1:
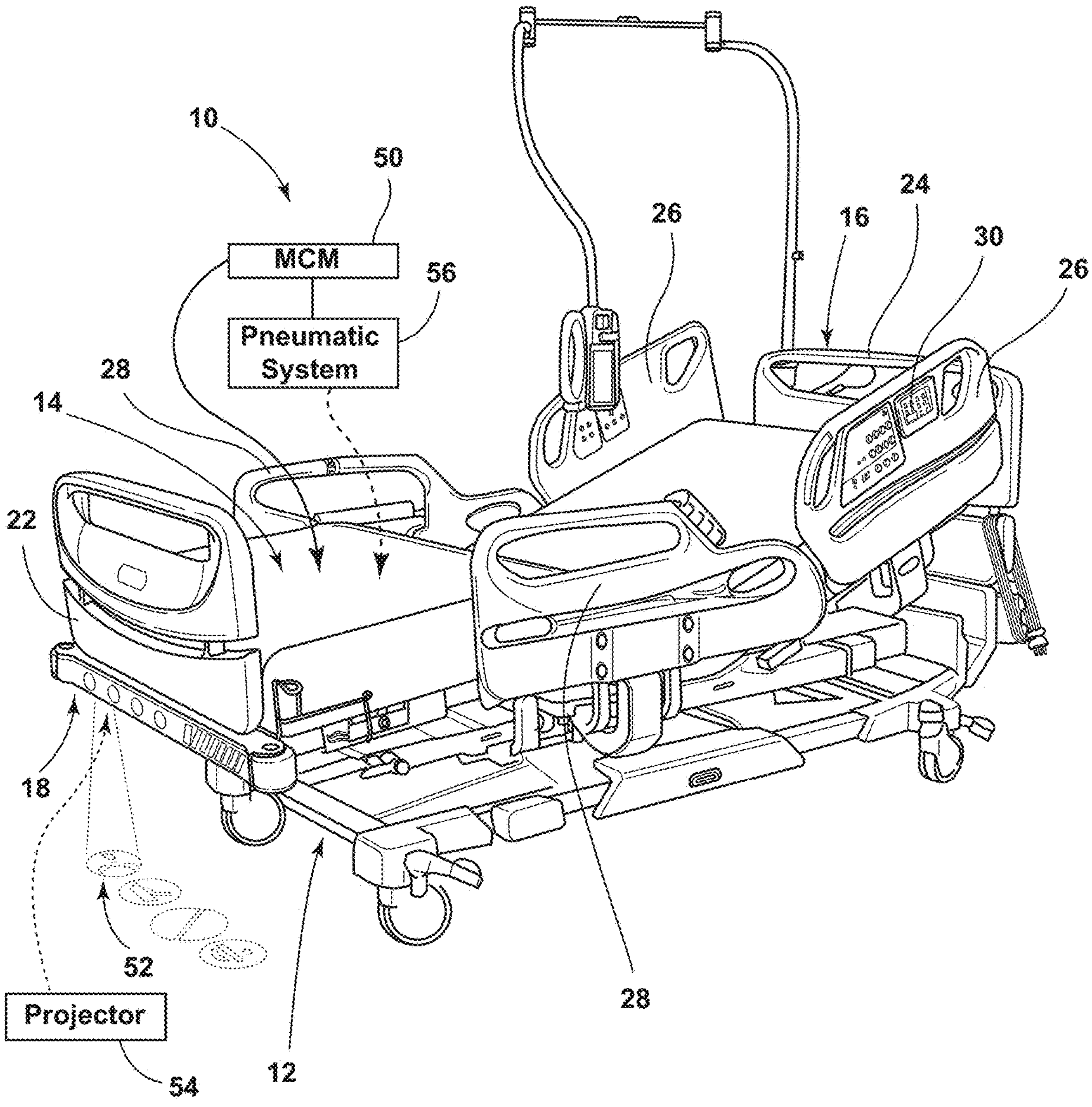
FIG. 1 is a perspective view of a patient support apparatus according to various aspects described herein.

The presently illustrated embodiments reside primarily in combinations of method steps and apparatus components related to a graphical user interface for a bed having a mattress function indicator. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to a surface of the device closest to an intended viewer, and the term "rear" shall refer to a surface of the device furthest from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1, 2, 3A, 7A, and 7B reference numeral 10 generally designates a patient support apparatus in the form of a bed including a frame 12, a mattress 14 supported on the frame 12, a graphical user interface 30 configured to accept user input, and a controller 20 configured to control functions of the mattress 14. The controller is further configured to communicate with the graphical user interface 30. The controller 20 may control the graphical user interface 30 to selectively display a home screen 32, a preferences menu screen 34 upon selection by a user input at the home screen 32, and a mattress function screen 36 upon selection by the user input at the preferences menu screen 34. The mattress function screen 36 may include a first input button 38 for enabling a mattress function control via the home screen 32 and a second input button 40 for disabling a mattress function control via the home screen 32.

Referring now to FIG. 1, the patient support apparatus 10 may include a hospital bed. The bed 10 also includes a surface, which may be formed by the mattress 14, supported by the frame 12. While described as the bed 10, it is within the scope of the disclosure that the patient support apparatus 10 may include a bed frame, a mattress, or any suitable structure for supporting a patient, including, but not limited to: other types of beds, surgical tables, examination tables, stretchers, and the like.

The bed 10 may include a head end 16 and a foot end 18. The bed 10 may further include a footboard 22 at the foot end 18 and a headboard 24 at the head end 16. Furthermore, the bed 10 may include a pair of head siderail assemblies 26 and a pair of foot siderail assemblies 28. In some examples, the graphical user interface 30 is coupled to an external side of at least one siderail of the siderail assemblies 26, 28. The graphical user interface 30 may be configured to accept a user input to control functions of the mattress 14 and/or the bed 10. While FIG. 1 illustrates the graphical user interface 30 coupled to the external side of at least one of the siderails of the siderail assemblies 26, 28, it is also contemplated that the graphical user interface 30 may be coupled to any suitable component of the bed 10 for access by a user or caregiver. In some examples, the graphical user interface 30 may be coupled to the footboard 22 or the headboard 24.

The bed 10 may include various mattress function technologies, such as a microclimate management (MCM) system 50. The MCM system 50 may address shear, friction, pressure, temperature, and moisture properties of the mattress 14 to optimize patient comfort and to keep a patient's skin cool and dry, which may aid in prevention of complications in patient recovery, such as wound or sore prevention. The MCM system 50 can prevent the occurrences of pressure ulcers by reducing the accumulation of heat and moisture that tends to occur on a person's skin when the person is supported on the bed 10.

Figure 2:
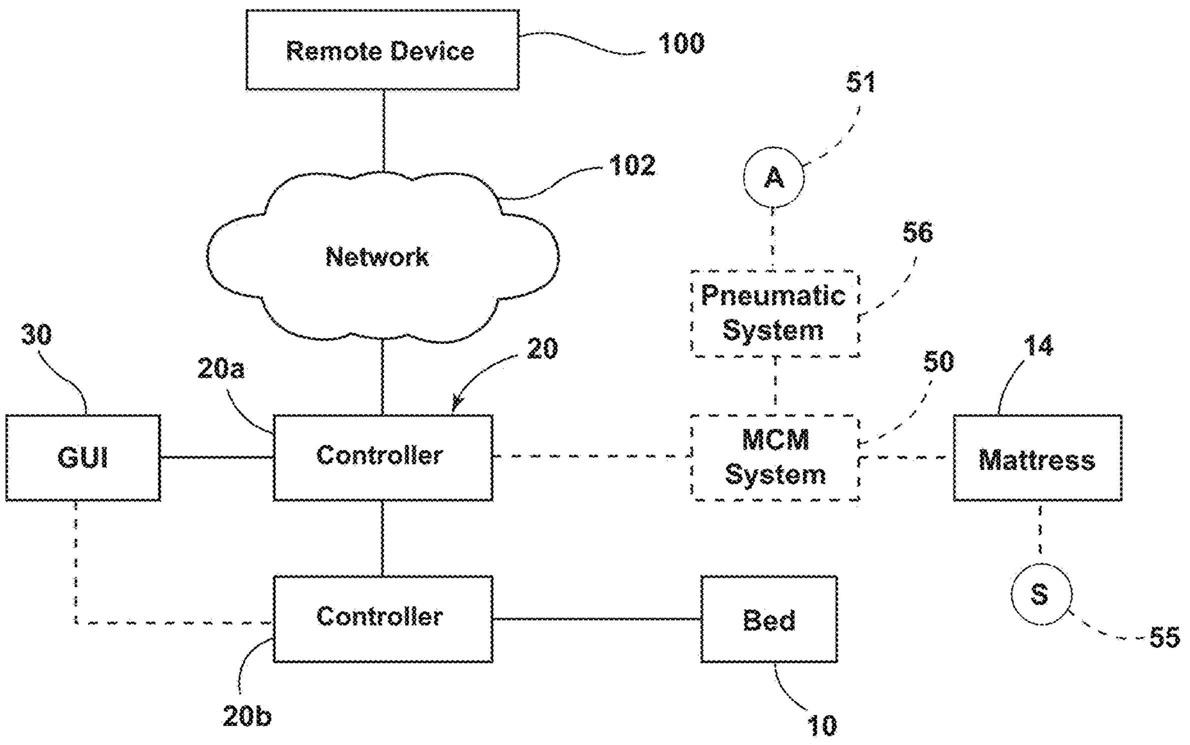
FIG. 2 is a diagram of a controller for the patient support apparatus of FIG. 1 according to various aspects described herein.

The MCM system 50 is arranged to underlie a patient supported on the bed 10 and may be in the form of a MCM layer disposed within an interior of the mattress 14. The bed 10 may further include a pneumatic system 56 that provides air for operation of the MCM system 50. The pneumatic system 56 may provide airflow in and out of various cavities including, but not limited to: air bladders, cells, vents, pores, or layers of the mattress 14, such as the MCM layer, via an actuator 51 (FIG. 2). The actuator 51 may include a blower, a pump and the like configured to control, or selectively transfer, a fluid to the MCM system 50 at a predetermined flow rate and/or temperature. The fluid may be in the form of air, which may include any suitable gas, but may also be in the form of any suitable liquid or mixture thereof. The actuator 51 is configured to selectively provide airflow for the MCM system 50 based on predetermined therapy functions. The predetermined therapy function may be selected automatically based on a control algorithm, or manually based on user input commands received from the graphical user interface 30, which will be described in more detail in the following paragraphs. In some examples, a MCM system status floor indicator 52 may be projected as an image onto the floor surface from a projector 54 coupled with the foot end 18 of the bed 10 to indicate whether the MCM system 50 is on or off.

With reference now to FIG. 2, the controller 20 may be in electrical communication with the bed 10 and/or the mattress 14 for gathering input, processing the input, and generating an output in response to the input. A first controller 20*a* may control the mattress 14, including the MCM system 50, and a second controller 20*b* may control the bed 10. However, it is within the scope of the disclosure for a single controller 20 to control both the bed 10 and the mattress 14. In some examples, the first controller 20*a* and the second controller 20*b* are in the form of a microcontroller and include one or more central processing units (CPUs), or microprocessors, memory, and programmable input/output ports. The first controller 20*a* may execute software to automatically control functions and algorithms for the mattress 14.

The first controller 20*a* is operatively coupled to the actuator 51 and includes an instruction set. The instruction set may cause the controller 20*a* to regulate at least one of a rate the fluid is supplied by the actuator 51 and temperature of the fluid supplied by the actuator to maintain a heat withdrawal capacity of at least a portion of the person contacting the mattress 14 below about 140 $W/m^2$. The controller 20*a* may be in communication with various sensors in electrical communication with the mattress 14 and/or the bed 10. For example, the MCM system 50 can include a plurality of sensors 55. The sensors 55 can be temperature sensors and/or moisture sensors that can be adapted to generate signals corresponding to the temperature and relative humidity of the mattress 14. The sensors 55 may communicate wirelessly with the controller 20*a* or via a wired connection. Other sensors 55 that the MCM system 50 can be in communication with include, but are not limited to: weight sensors, potentiometers, encoders, or other angular detection sensors, pressure sensors, density sensors, etc.

The user input, such as the input to the graphical user interface 30, may be provided by the caregiver or the patient to communicate with the controller 20*a* in order to command the operation of functions of the mattress 14.

In some examples, the controllers 20*a*, 20*b* are in communication with a remote device 100 via a network 102, such as the internet, a hospital wireless infrastructure, such as an electronic medical record (EMR), an Ethernet, and the like. The controllers 20*a*, 20*b* may communicate with the network 102 via Wi-Fi, Bluetooth, cables, or any other suitable technology for exchanging data from the bed 10 and the mattress 14 to the remote device 100. As the first controller 20*a* and the second controller 20*b* may be in communication with the remote device 100, the mattress 14 may be fully integrated with the bed 10. For example, the controller 20*a* may transmit a status of the mattress 14 and/or health determined by the controller 20*a* from various input from the sensors 55 to second controller 20*b* of the bed 10 and to the hospital wireless infrastructure, which may be useful for the hospital or for maintenance of the bed 10. Furthermore, mattress therapy or functions of the mattress 14 may be configured or accessed remotely by the remote device 100.

Figure 3A:
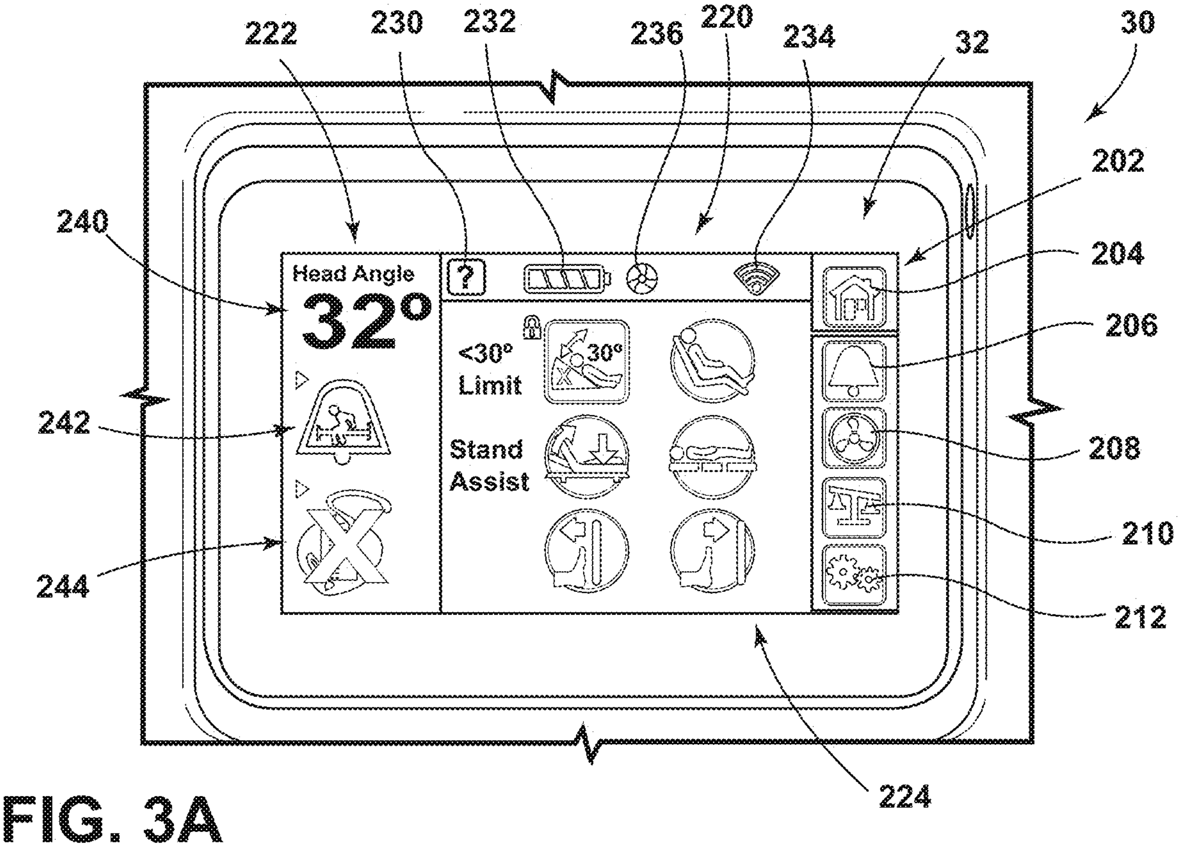
FIG. 3A is a screen capture of a graphical user interface according to various aspects described herein.
Figure 3B:
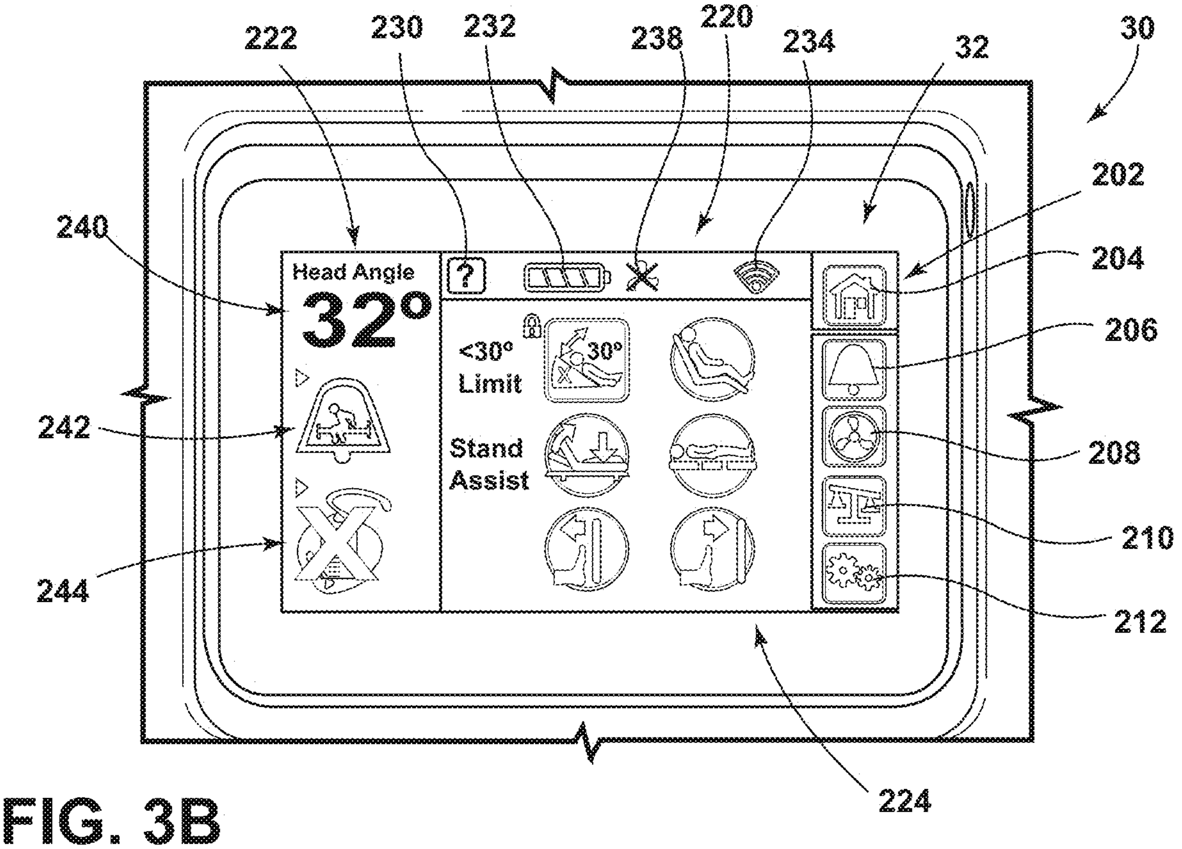
FIG. 3B is a screen capture of a graphical user interface according to various aspects described herein.

FIGS. 3A-3B illustrate a display screen, in the form of a first screen, or a home screen 32, of the graphical user interface 30. The graphical user interface 30 may be controlled by the controller 20 to selectively display the home screen 32. The home screen 32 may include a first set of various icons, indicators, or buttons, which may be configured for user input. The controller 20 (FIG. 2) may receive the user input commands from the graphical user interface 30 when the display screen, such as the home screen 32, is displayed. The user input commands may be communicated in response to a user interaction with the display screen by inputting commands to control various functions of the mattress 14, such as controlling the MCM system 50 (FIG. 1).

The home screen 32 may include a menu section 202 having a home screen icon 204. When the home screen icon 204 is actuated, or selected, by the user, the home screen 32 may be displayed by the graphical user interface 30. The menu section 202 may include a plurality of additional icons and/or inputs, such as an alerts icon 206, that when selected causes an alerts menu screen to be displayed; a MCM system icon 208, that when selected causes a MCM menu screen (FIGS. 5A and 5B) to be displayed; a scale icon 210, that when selected causes a scale menu screen to be displayed; and a preferences icon 212, that when selected causes a preferences menu screen (FIG. 7A) to be displayed. Selecting the icons 206, 208, 210, 212 provides accessibility to the corresponding screen via the home screen 32. The menu section 202 may include additional or fewer icons than what is illustrated in FIG. 3A.

The home screen 32 may further include an information section 220, a status section 222, and an interaction section 224. The information section 220 may include a help screen icon 230 which, upon selection, causes a help screen to be displayed, a battery status indicator 232 that displays a graphical representation of a battery charge level of a battery for the bed 10 or the mattress 14, and a network indicator 234 that may be visible when the bed 10 is connected to the network 102 (FIG. 2). The information section 220 may further include mattress function icons that may relate to various functionalities of the mattress 14. Mattress function icons may be in the form of a MCM "on" indicator icon 236 (FIG. 3A) that indicates that the MCM system 50 is on, or active, or a MCM "off" indicator icon 238 (FIG. 3B) that indicates that the MCM system 50 is off, or inactive. The MCM "on" indicator icon 236 may include a graphical representation of a fan, which may be colored and spinning. In some examples, the color of the MCM "on" indicator icon 238 may include green. The MCM "off" indicator icon 238 may include a graphical representation of a fan, which may be muted in color and have an "X" displayed over the image. In such an example, the graphical representation of the MCM "off" indicator icon 238 may be still. In further examples, the MCM "off" indicator icon 238 may be colored red, or colored with a contrasting color from the MCM "on" indicator icon 236.

The status section 222 may include various indicators which may be in the form of a current head angle indicator 240, an alert condition indicator 242, and/or a fluids monitoring indicator 244. The status section 222 is not limited to the indicators described herein and may include additional or fewer indicators. The interaction section 224 may include icons that, when selected, cause a corresponding menu screen to be displayed in order to control various functions of the mattress 14 and/or the bed 10.

Figure 4A:
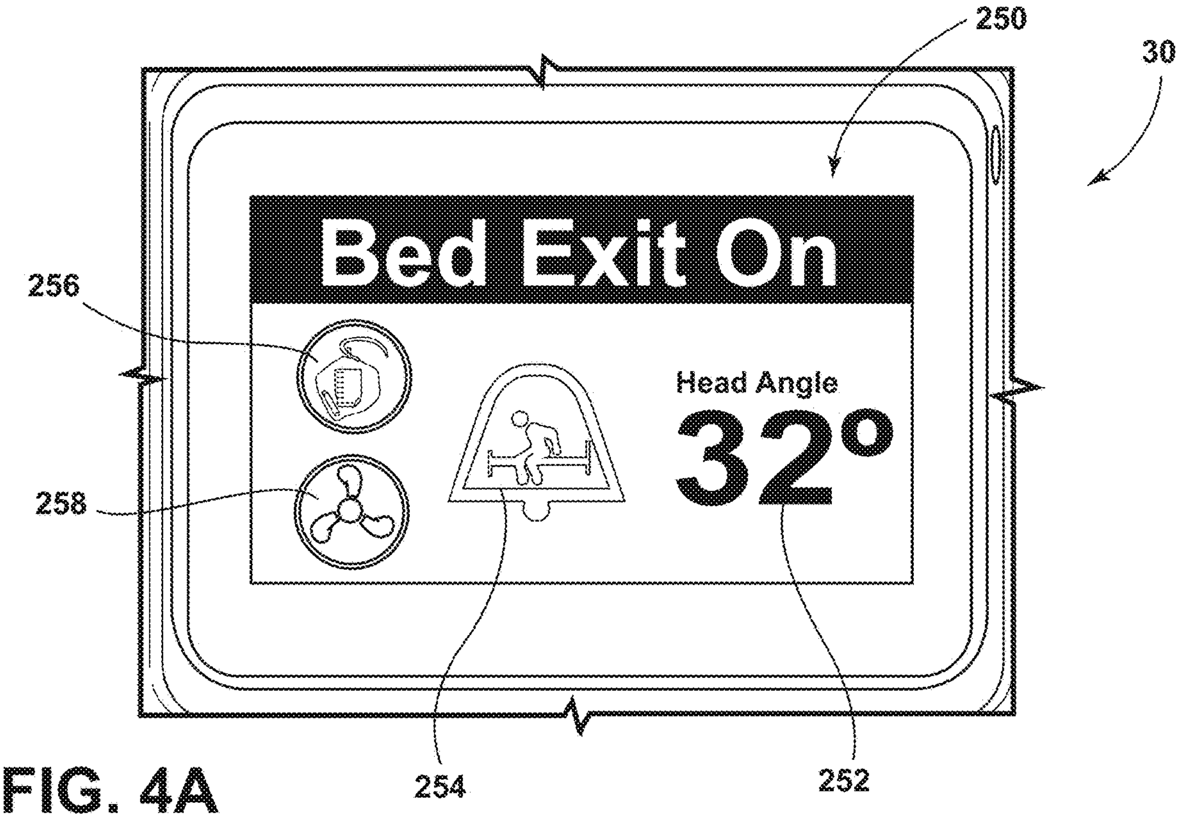
FIG. 4A is a screen capture of a graphical user interface according to various aspects described herein.
Figure 4B:
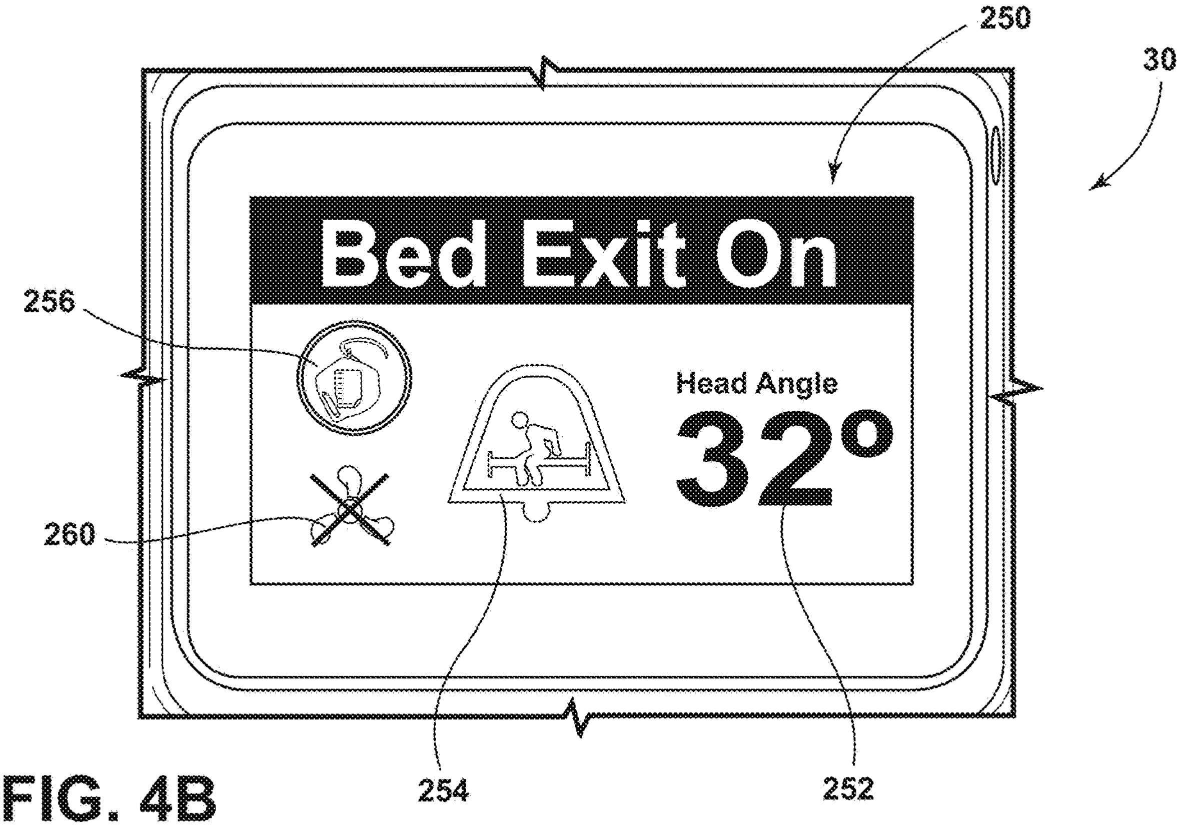
FIG. 4B is a screen capture of a graphical user interface according to various aspects described herein.

FIGS. 4A and 4B illustrate a second screen or a display screen 250 that may be selectively displayed after a predetermined amount of time has elapsed since user interaction with the home screen 32. In this way, the controller 20 monitors the graphical user interface 30 for user input. User interaction may include user input to the home screen 32. In some examples, the predetermined amount of time may include three minutes. The display screen 250 may include a second set of icons including fewer icons than the home screen 32 first set of icons. Thus, the icons included on the display screen 250 may be larger in size than the icons on the home screen 32 such that a caregiver may more easily view the display screen 250 and information thereon from a distance. In this way, an unambiguous visual indication of various features of the mattress 14, such as function controls, may be provided. The features provided may include wound prevention features associated with the MCM system 50. In some examples, at least one icon may include a MCM system icon such as an "on" or "off" indicator icon on the display screen 250, which may be at least 50% larger than a corresponding MCM "on" or "off" indicator icon on the home screen 32. Additionally, at least one icon may include a MCM "on" or "off" indicator icon on the display screen 250, which may utilize, or encompass, approximately 6-25% of the surface of the display screen 250, as opposed to a corresponding MCM "on" or "off" indicator icon on the home screen 32, which may utilize less space of the surface of the home screen 32, which may include only 2-10%. Thus, the caregiver may assess the function of the mattress 14, such as the function of the MCM system 50, at a glance from remote positions in a hospital room or from a doorway, which may be away from a bedside.

Furthermore, the display screen 250 may be dimmed compared to the home screen 32. In this way, the display screen 250 may include a level of brightness which is less than a level of brightness of the home screen 32. It is also within the scope of the present disclosure that the home screen 32 may dim after a predetermined amount of time of inactivity, or since user input, for example, two minutes prior to displaying the display screen 250, which may or may not be dimmed. While described as being dimmed, it is also contemplated that the display screen 250 may be brighter than the home screen 32. It is also possible that the display screen 250 may be flashing or may include different display colors than the home screen 32.

The configuration of the displayed icons and indicators may be personalized by the user or caregiver for the display screen 250 to display the information that is most desirable by the user or caregiver from a distance. In the examples illustrated in FIGS. 4A and 4B, the display screen 250 includes a current head angle indicator 252, an icon 254 providing an indication that a patient position monitoring system is set to alert if the patient exits the bed 10, and a fluids monitoring indicator 256. The display screen 250 may further include a MCM "on" indicator icon 258 (FIG. 4A) or a MCM "off" indicator icon 260 (FIG. 4B). In some examples, the MCM "on" indicator icon 258 may be spinning, blinking, flashing, brighter in color, etc. in order to further catch the attention of the user or caregiver. In additional examples, the MCM "off" indicator icon 260 may be still, muted in color, blinking, flashing, etc. As such, the user or caregiver may easily determine whether or not the MCM system 50 is on or off when the user or caregiver is at a distance away from the bed 10. In some examples, the icons included on the display screen 250, such as the icons 258 and 260, may be visibly discernable by a user having naked eye normal acuity from at least three meters. In the present disclosure, normal acuity may be considered 20/20 vision and may include the use of corrective lenses. Thus, conditions and/or states of the mattress 14 may be communicated to a caregiver for more immediate attention, which may ultimately result in improved wound outcomes by reducing the downtime of wound healing functions, such as the MCM system 50.

Figure 5A:
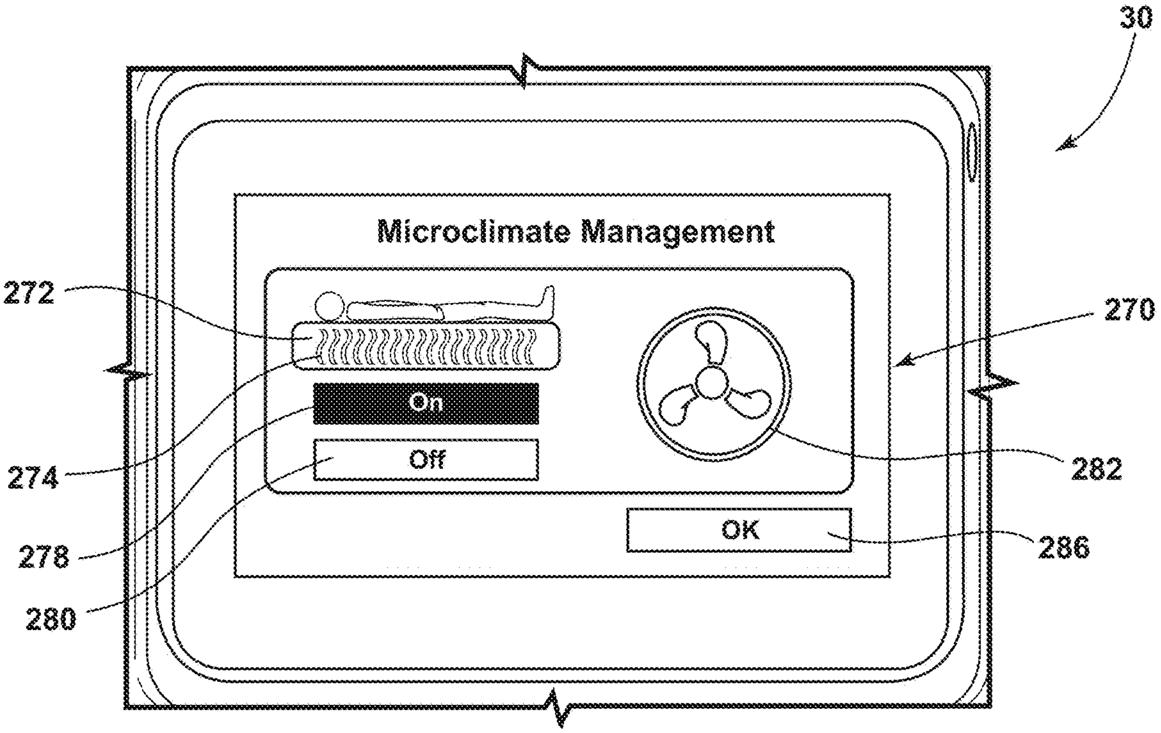
FIG. 5A is a screen capture of a graphical user interface according to various aspects described herein.
Figure 5B:
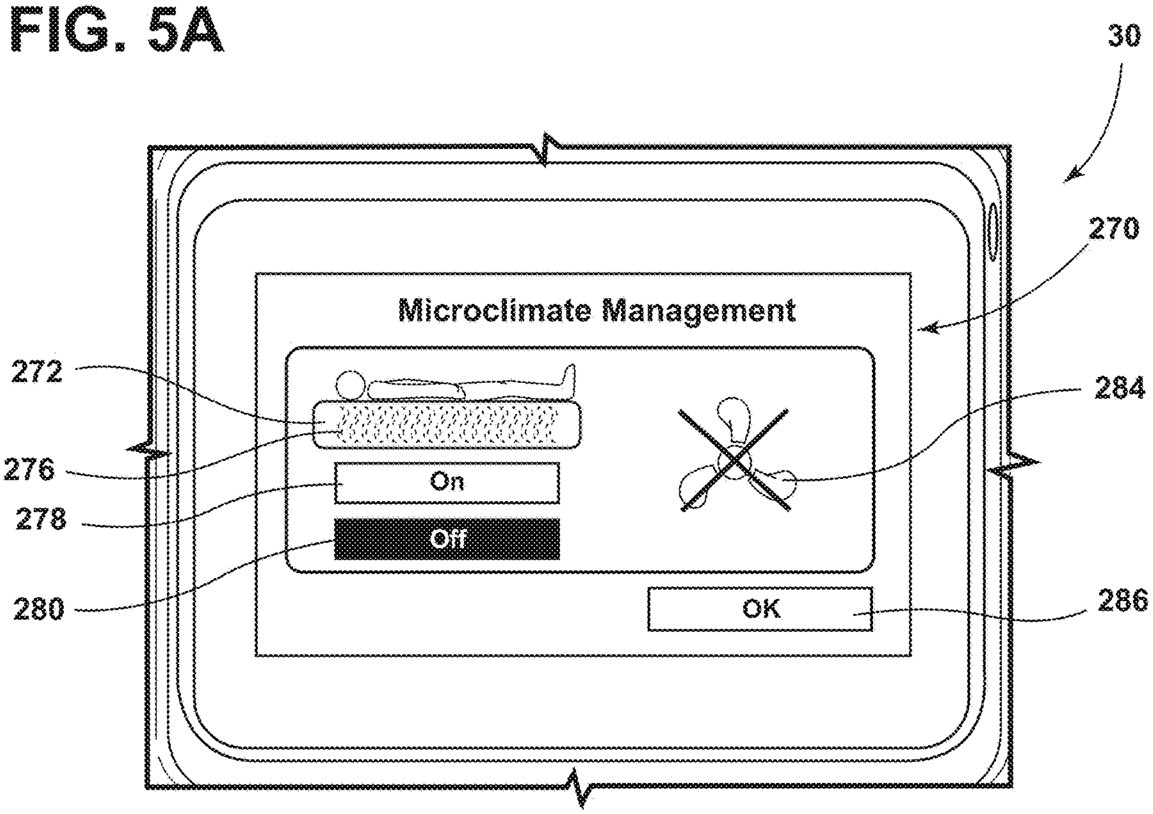
FIG. 5B is a screen capture of a graphical user interface according to various aspects described herein.

FIGS. 5A and 5B illustrate an exemplary MCM menu screen 270, which may be displayed upon selection of the MCM system icon 208 on the menu section 202 such that the MCM menu screen 270 may be accessible via the home screen 32. In this way, the controller 20 may prompt the user via the MCM menu screen 270 to control the MCM system 50 without unplugging the bed 10. A graphical representation 272 of a person disposed on a mattress may be provided on the MCM menu screen 270. As shown in FIG. 5A, in the case where the MCM system 50 is currently off, or deactivated, and the user desires to activate, or turn the MCM system 50 on, an On button 278 may be selected by the user. The graphical representation 272 may include graphical representations of blowers 274 within the graphical representation 272 of the mattress to further indicate that the On button 278 has been selected. Even further, a MCM "on" indicator icon 282 may be displayed. An OK button 286 may be provided to confirm the change such that the controller 20 may activate the MCM system 50. Alternatively, in some examples where a default setting for a new patient includes activation of the MCM system 50, the MCM system 50 may be turned on by user selection of a new patient, or "zero" button, which may include the scale icon 210.

FIG. 5B illustrates the case where the MCM system 50 is currently on or activated, and the user desires to deactivate or turn the MCM system 50 off. An Off button 280 may be selected by the user and the graphical representation 272 may include graphical representations of phantom blowers 276 within the graphical representation 272 of the mattress to further indicate that the Off button 280 has been activated. Even further, a MCM "off" indicator icon 284 may be displayed. Again, the OK button 286 may be provided for selection by the user to confirm the change such that the controller 20 deactivates the MCM system 50.

In addition to the On button 278 and the Off button 280, the MCM menu screen 270 may include additional buttons for selection by the user to instruct the controller 20 to activate or deactivate the MCM system 50 for predetermined amounts of time. For example, one button may indicate that the MCM system 50 may be deactivated for two hours, which may be indicated by an Off for 2 Hours button (not shown). In further examples, another button may include an indication that the MCM system 50 may be activated for four hours, which may be indicated by an On for 4 Hours button.

Figure 6:
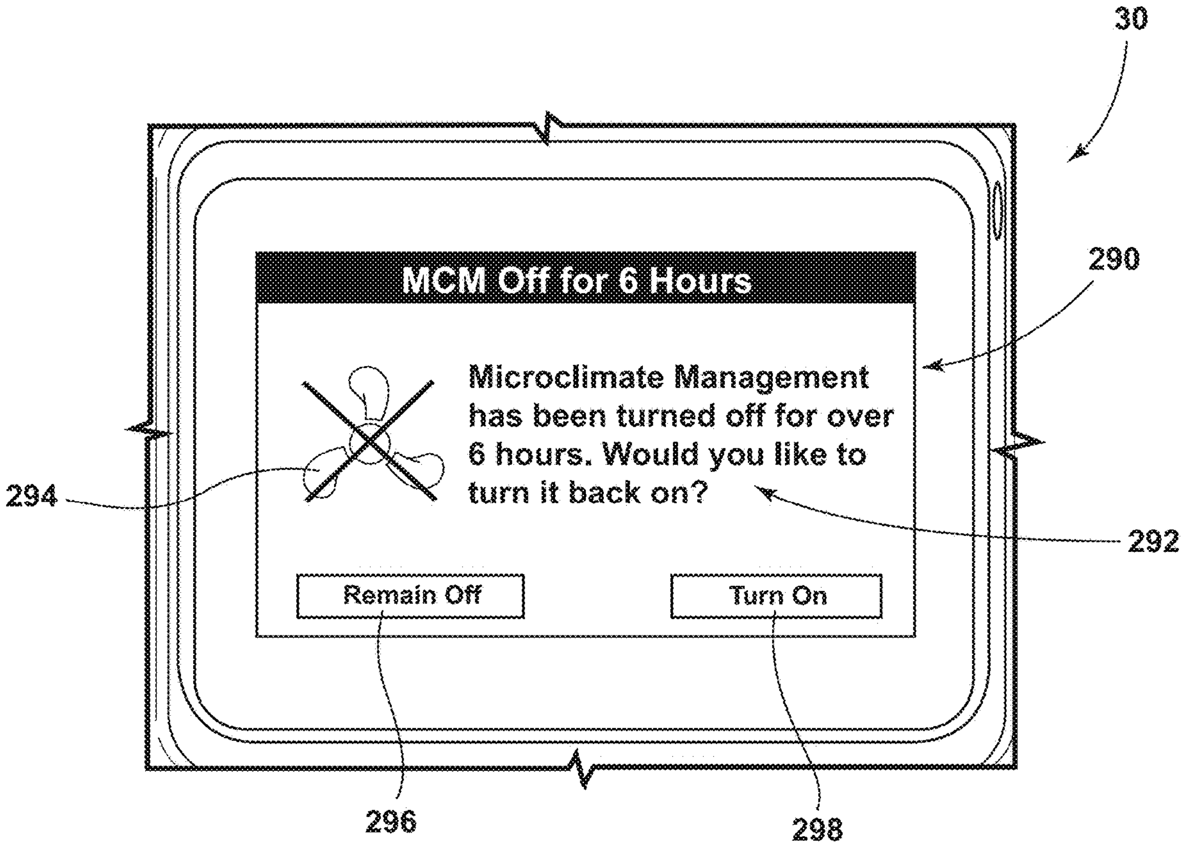
FIG. 6 is a screen capture of a graphical user interface according to various aspects described herein.

FIG. 6 illustrates an exemplary MCM notification screen 290. The MCM notification screen 290 may include a notification text 292 and a notification icon 294. In the illustrated example, the notification text 292 explains that the MCM system 50 has been inactive for more than a predetermined amount of time and asks if the user would like to activate the MCM system 50. Furthermore, in the illustrated example, the notification icon 294 is in the form of a MCM "off" indicator icon. However, it is within the scope of the disclosure for the MCM notification screen 290 to include other notifications via the notification text 292. For example, the notification text 292 may explain that the MCM system 50 has been active for more than a predetermined amount of time and may ask if the user would like to deactivate the MCM system 50. In this instance, the notification icon 294 may be in the form of a MCM "on" indicator icon. The controller 20 may determine that the MCM system 50 has been active for more than a predetermined amount of time, which may include determining the length of time that the actuator 51, such as a blower has been active or running.

The MCM notification screen 290 may also include buttons 296, 298 for controlling the MCM system 50. The buttons 296, 298 may differ depending on whether the MCM system 50 has been off, as shown in FIG. 6, or on. In the case where the MCM notification screen 290 indicates that the MCM system 50 has been off, the buttons 296, 298 may include a Remain Off button 296 and a Turn On button 298. Alternatively, in the case where the MCM notification screen 290 indicates that the MCM system 50 has been on, the buttons 296, 298 may include a Remain On button and a Turn Off button. In some examples, the MCM notification screen 290 may remain on the graphical user interface 30 until one of the buttons 296, 298 are selected by the user.

Figure 7A:
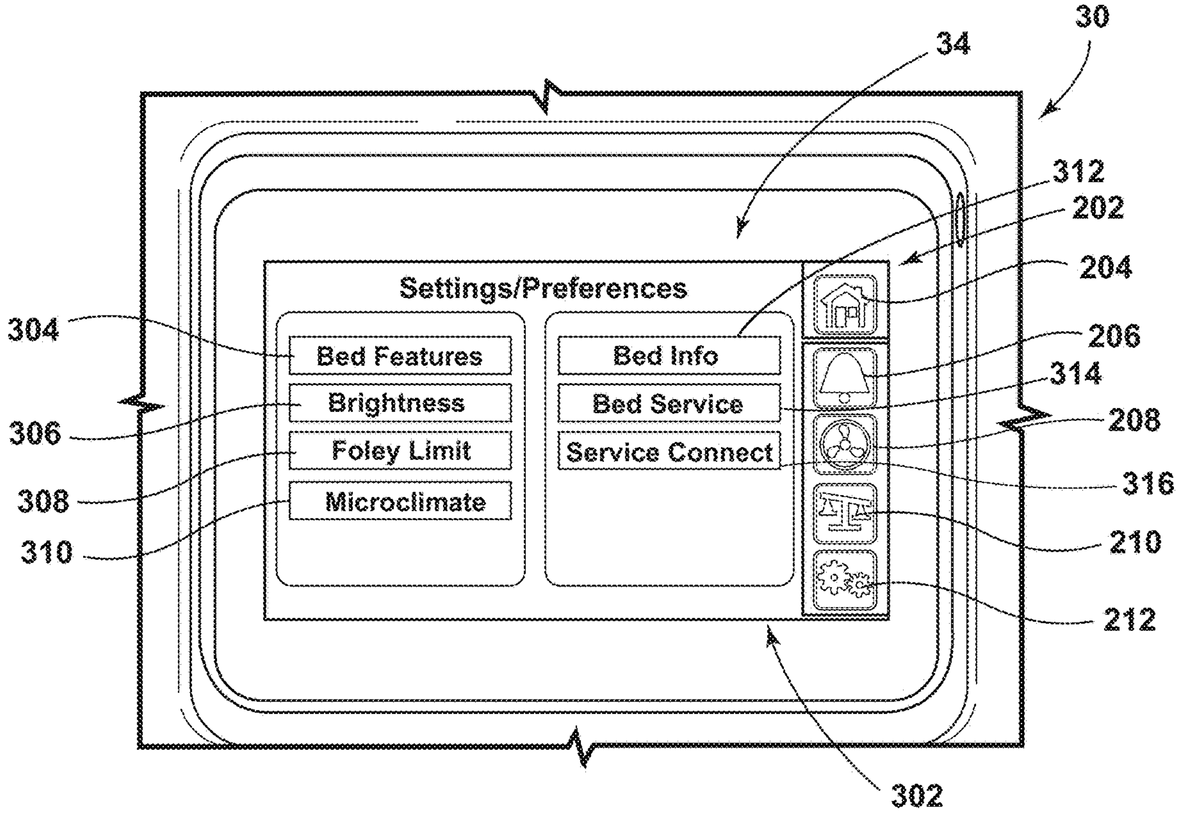
FIG. 7A is a screen capture of a graphical user interface according to various aspects described herein.
Figure 7B:
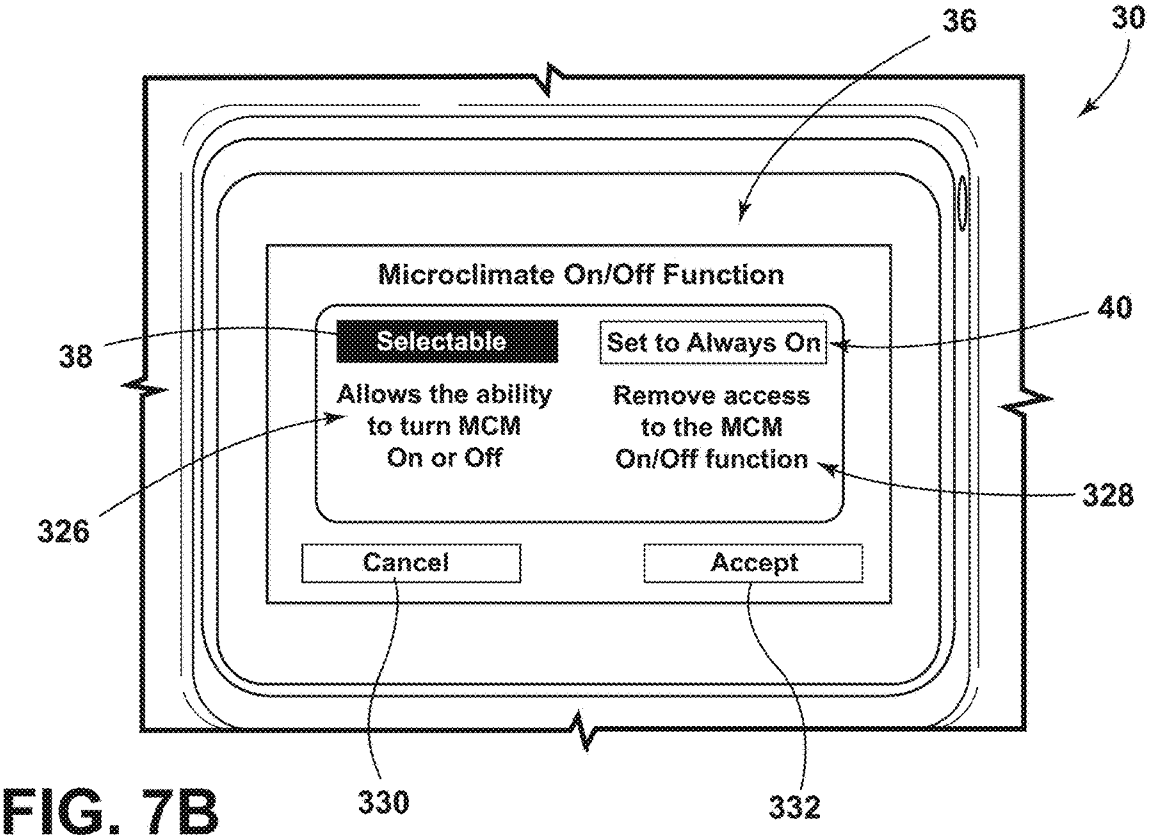
FIG. 7B is a screen capture of a graphical user interface according to various aspects described herein.

FIG. 7A illustrates an exemplary preference menu screen 34, which may be in the form of a second screen, accessible via the home screen 32 upon selection by user input at the home screen 32, which may be in the form of a first screen. The preferences menu screen 34 may include the menu section 202 and an interaction section 302, which is similar to the interaction section 224, but may include a plurality of various input buttons 304, 306, 308, 310, 312, 314, 316 related to control settings or preferences for communicating with the controller 20 and displaying the information on the graphical user interface 30. The buttons 304, 306, 308, 310, 312, 314, 316 may be in the form of any suitable user input, such as soft keys and the like. In some examples, the buttons 304, 306, 308, 310, 312, 314, 316 may include a Bed Features button 304, a Brightness button 306, a Foley Limit button 308, a Microclimate button 310, a Bed Info button 312, a Bed Service button 314, and a Service Connect button 316. In some examples, the buttons 304, 306, 308, 310, 312, 314, 316 include mattress function control selection buttons, such as the Microclimate button 310. The buttons or inputs described herein are only exemplary, and are not limited to only these examples. Upon selection of one of the buttons 304, 306, 308, 310, 312, 314, 316 the graphical user interface 30 may display a screen specific to controlling preferences related to the selected button 304, 306, 308, 310, 312, 314, 316. For example, in order to access the MCM system 50 preferences, the user may select the Microclimate button 310 at the preferences menu screen 34, which may result in the controller 20 controlling the graphical user interface 30 to display a microclimate activation and deactivation function screen, such as the mattress function screen 36, which may be in the form of a Microclimate On/Off Function screen, as shown in FIG. 7B. Thus, the Microclimate On/Off Function screen 36 may be accessible via user input at the preferences menu screen 34.

The Microclimate On/Off Function screen 36 may include one or more input buttons, such as the first input button 38 and the second input button 40, for controlling the accessibility, or ability, to control the MCM system 50 from the display screen, such as the home screen 32. In this way, control settings of the mattress 14 may be enabled or disabled by the controller 20 for bedside use depending on clinical preference. For example, the controller 20 may suppress access to control the actuator 51 such that the control of the operation of the actuator 51 may be restricted or limited to authorized personnel, who may be trained on how to withdraw or bypass the suppression of the display of a control or user input on the graphical user interface 30. In a specific example, user input to the Microclimate On/Off Function screen 36 may result in the controller 20 disabling, or eliminating, the MCM system icon 208 and the MCM menu screen 270 from being displayed on the home screen 32. Accordingly, the controller 20 may restrict or prevent the user from accessing a control input at the home screen 32 to adjust the settings, including the rate of flow through the actuator 51, of the MCM system 50. In some examples, selection of the first input button 38 enables the MCM system icon 208 to be visible from the home screen 32 while selection of the second input button 40 results in the MCM system icon 208 to be hidden from the home screen 32. While described as a Microclimate On/Off Function screen 36, it is contemplated that the Microclimate On/Off Function screen 36 may correspond to any function of the mattress 14.

As shown in FIG. 7B, the first input button 38, such as a Selectable button 38, may designate a choice for allowing a user to have the ability to activate the MCM system 50 or deactivate the MCM system 50 from the home screen 32. Stated another way, the Selectable button 38 may enable control of the MCM system 50 by user input via the home screen 32. Accordingly, a control setting of the controller 20 may be updated such that a user can provide input to the controller 20 at the home screen 32 configured to instruct the controller 20 to adjust the settings of the MCM system 50, which may include activation of the MCM system icon 208. The second input button 40, such as a Set to Always On button 40, may designate a choice for removing user access to deactivate the MCM system 50 from the home screen 32. Stated another way, the Set to Always On button 40 may disable control of the MCM system 50 via the home screen 32 such that a user input to the controller 20 is suppressed or omitted from the home screen 32. In this configuration, the controller 20 effectively suppresses the manual control of the settings of the MCM system 50. Thus, controller 20 controls the MCM system 50 to remain on, and the MCM "on" indicator icon 236 may be displayed on the home screen 32. The Microclimate On/Off Function screen 36 may further include text 326 and text 328 to describe the Selectable button 38 and the Set to Always On button 40, respectively. Optionally, the Microclimate On/Off Function screen 36 may include a Set to Always Off button that may designate a choice for removing access to activate the MCM system 50 from the home screen 32 by user input at the home screen 32 such that the controller 20 controls the MCM system 50 to remain off, and the MCM "off" indicator icon 238 may be displayed.

In order to complete the selection of buttons 38 or 40, the user may select an Accept button 332. A Cancel button 330 may be provided to exit the Microclimate On/Off Function screen 36 and to retain the current preferences for control of the MCM system 50. In the case where the user desires to remove access of the caregiver from deactivating the MCM system 50, which may include deactivating the actuator 51, the user may select the Set to Always On button 40 followed by the Accept button 332 to accept the selection of the Set to Always On button 40. Accordingly, the MCM system 50 may not be deactivated in response to user input at the home screen 32. Once the selection to remove access to deactivate the MCM system 50 has been accepted by the Accept button 332, the controller 20 may reconfigure the display arrangement of home screen 32 as shown in FIG. 7C.

Figure 7C:
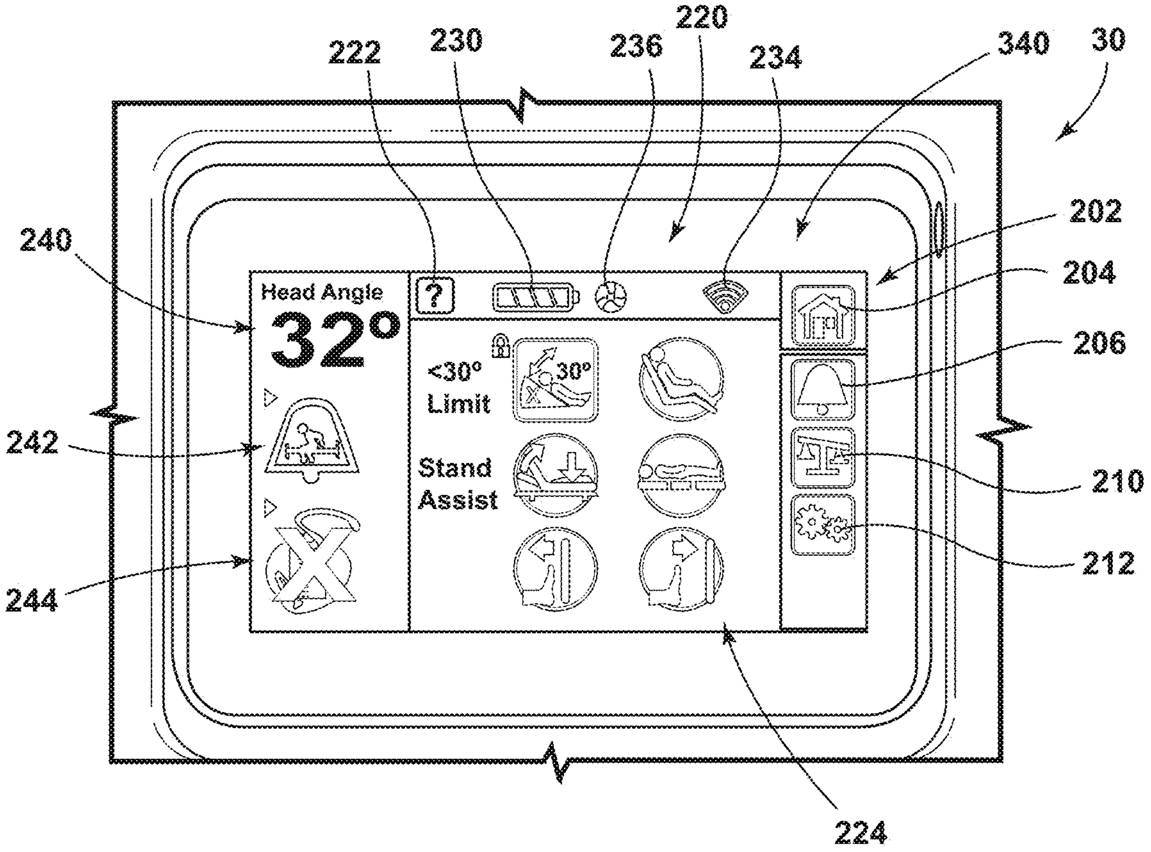
FIG. 7C is a screen capture of a graphical user interface according to various aspects described herein.

With reference now to FIG. 7C, an alternative home screen 340 is illustrated. The alternative home screen 340 is similar to the home screen 32 (FIG. 3A) with a difference being that the controller 20 may suppress the MCM system icon 208 (FIG. 3A) on the menu section 202 from the home screen 340 such that the MCM system icon 208 may not be displayed, or available for user interaction. In this way, the home screen 340 is free of the MCM system icon 208. Therefore, the user may not control the MCM system 50 via the MCM system icon 208 and the MCM menu screen 270. In this way, the ability to control the MCM system 50 is buried into the preferences menu screen 34 and cannot be accessed unless the user has access to the preferences menu screen 34. Access to the preferences menu screen 34 may be limited by knowledge of the menu screen 34, by a user login where the user is prompted to provide appropriate credentials, or any other suitable method of identifying the user as eligible to access the preferences menu screen 34. Accordingly, the controller 20 is configured to provide selective access to the preferences menu screen 34. In this example, the MCM "on" indicator icon 236 may be displayed and remains in this state until the settings are changed, which may include interacting with the preferences menu screen 34.

In some implementations, the controller 20 may detect that the remote device 100 is within a predetermined proximity (e.g. connected via a short-to-medium range radio frequency signal [NFC, Bluetooth, etc.]) to the bed 10. The controller 20 may automatically respond to the detection of the remote device 100 within the predetermined proximity by withdrawing suppression of the control features such that a user can provide input to the controller 20 at the home screen 32 configured to instruct the controller 20 to adjust the settings of the MCM system 50, thereby enabling the control input on the home screen 32. Thus, the controller 20 may control the graphical user interface 30 to display the MCM system icon 208 on the home screen 32. As such, the controller 20 may automatically update the control setting when patients are being observed by a caregiver based on the detection of the remote device 100. In this way, a patient may not have access to adjust the settings of the MCM system 50 when the remote device 100, which may be associated with a caregiver, is not within the predetermined proximity. Furthermore, when the controller 20 detects the absence of the remote device, such that the remote device 100 is no longer within a predetermined proximity of the bed 10, or outside the predetermined proximity, the controller 20 may suppress the control input on the home screen 32, or continue to maintain suppression, such that a user cannot provide input to the controller 20 at the home screen 32 configured to instruct the controller 20 to adjust the settings of the MCM system 50.

Furthermore, detecting that the remote device 100 is within a predetermined proximity can be implemented to control any of the features described herein. For example, upon detection of the remote device 100 within a predetermined proximity, the controller 20 may control the graphical user interface 30 to display the display screen 250, which may include fewer and larger icons than the home screen 32 first set of icons.

As previously discussed, mattress therapy or functions of the mattress 14 may be configured or accessed remotely by the remote device 100. Accordingly, the remote device 100 may configured to instruct the controller 20 to remotely control the actuator 51. For example, the controller 20 may be in communication with the remote device 100 such that a user may control the MCM system 50 remotely by the remote device 100. Therefore, even if the controller 20 effectively suppresses the manual control of the settings of the MCM system 50 by a user from the home screen 32 of the graphical user interface 30, the settings of the MCM system 50 may be controlled by a user accessing the remote device 100. In this way, the settings of the MCM system 50 may be adjusted by an authorized healthcare provider, or user, having access to the remote device 100 despite the suppression of manual control of the MCM system 50 via the graphical user interface 30.

Figure 8A:
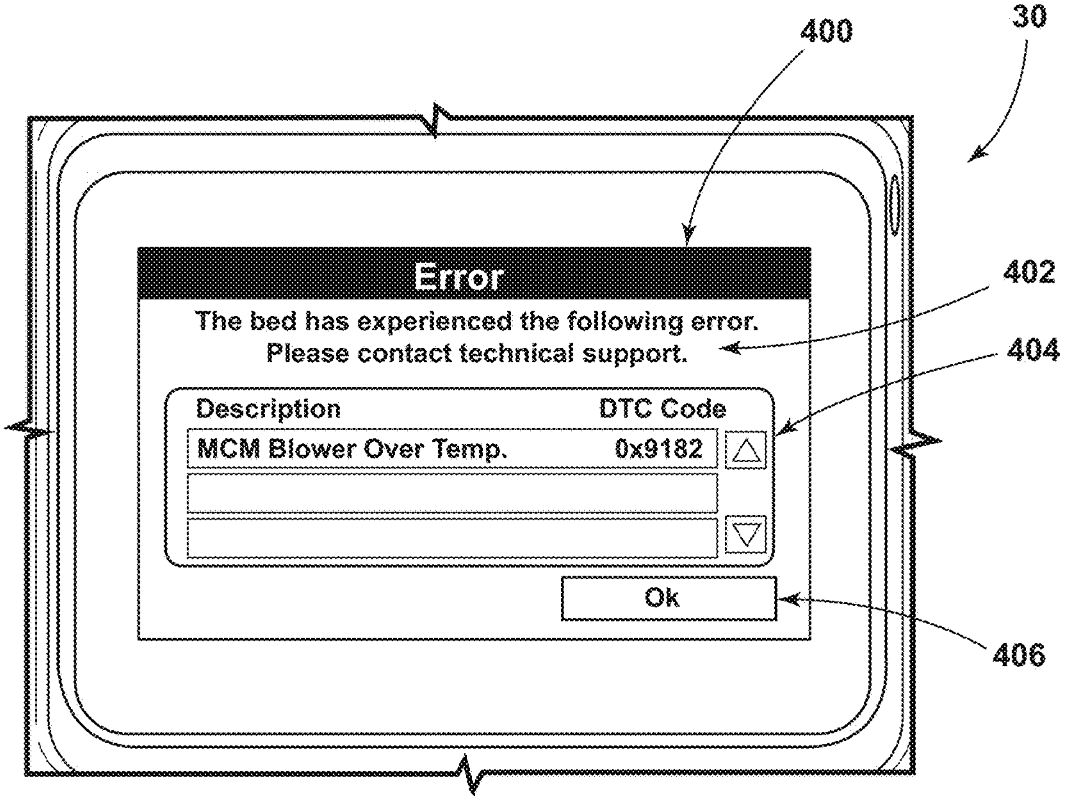
FIG. 8A is a screen capture of a graphical user interface according to various aspects described herein.
Figure 8B:
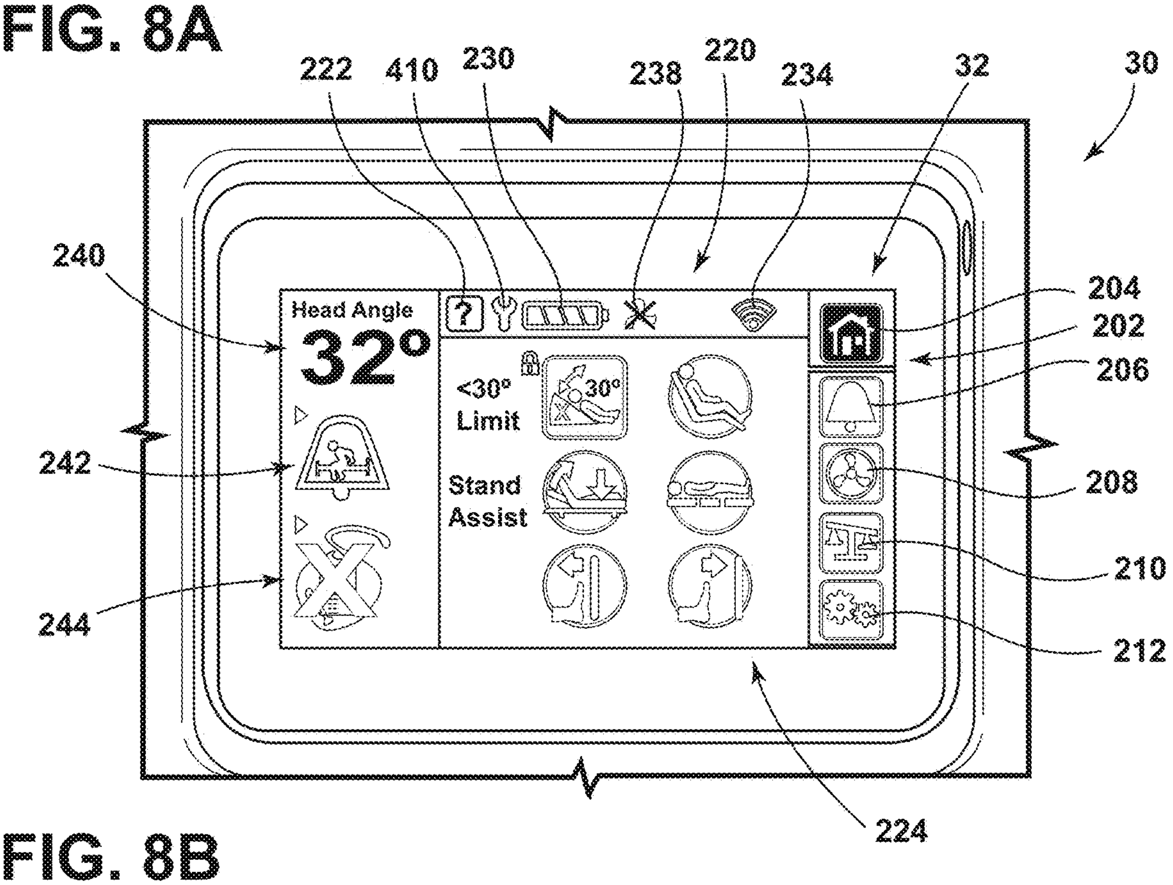
FIG. 8B is a screen capture of a graphical user interface according to various aspects described herein.

FIG. 8A illustrates an exemplary maintenance notification screen 400. The maintenance notification screen 400 may provide a notification 402 that an error has occurred in components of the bed 10, along with a description 404 of the error. The controller 20 may detect that a sensor or actuator is not operating within an operating range and determine that an error has occurred in the corresponding component. Thus, in the case where an error has occurred with a component of the MCM system 50, the user may be alerted with readily available information. The maintenance notification screen 400 may remain displayed on the graphical user interface 30 until the user provides an interaction or input. An Ok button 406 may be provided such that actuating the Ok button 406 allows the graphical user interface 30 to exit the maintenance notification screen 400. In some examples, the graphical user interface 30 may return to the home screen 32 upon actuation of the Ok button 406, which is shown in FIG. 8B. In this example, a maintenance indicator 410 on the home screen 32 may provide an indication that the bed 10 requires maintenance, which may include maintenance corresponding with the error notification 402.

Figure 9:
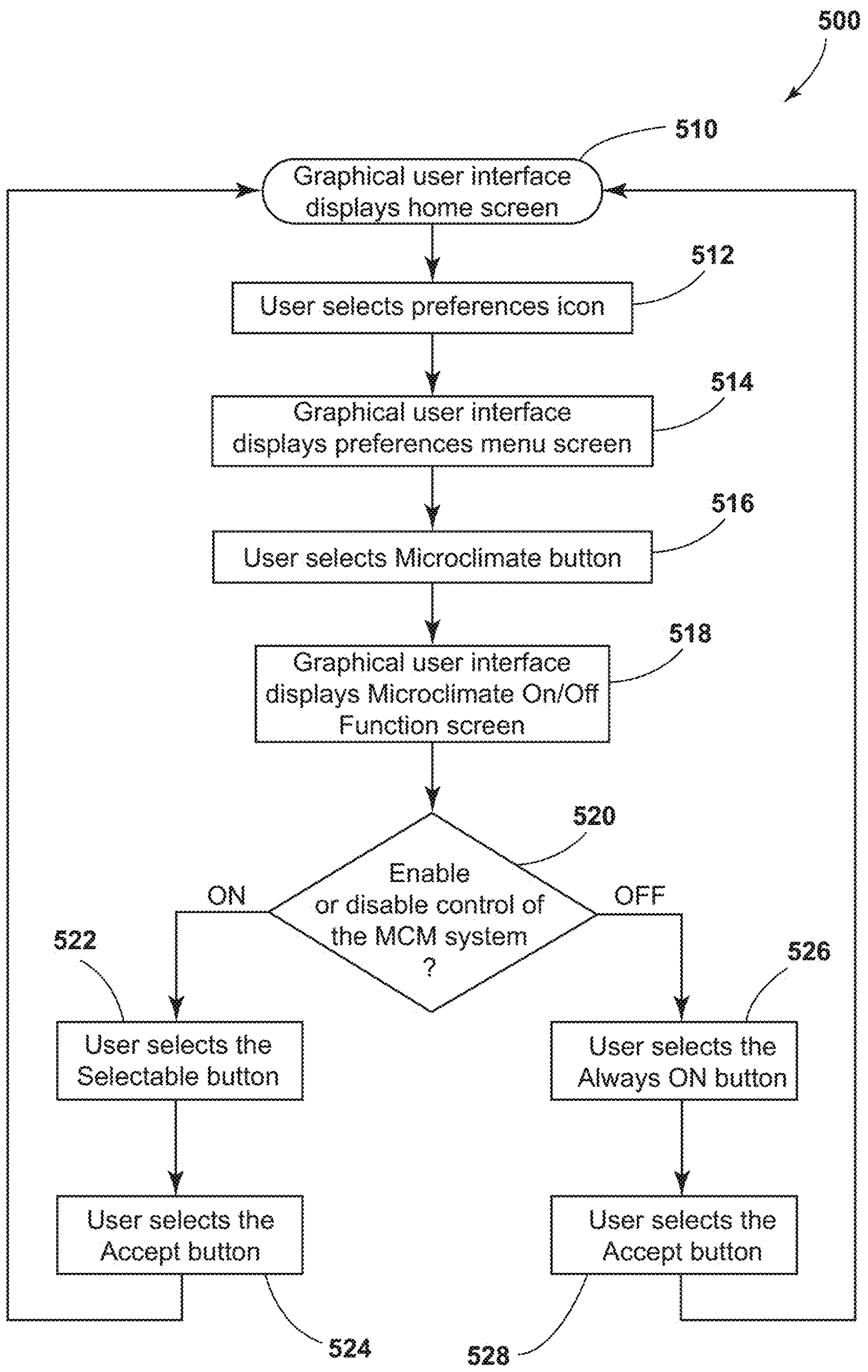
FIG. 9 is a flow chart illustrating a method of turning a microclimate management (MCM) system control on or off according to various aspects described herein.

FIG. 9 illustrates a method 500 of turning the MCM system 50 control on or off. The method may start at step 510 where the controller 20 controls graphical user interface 30 to display the home screen 32. At step 512, a user may select the preferences icon 212. Next, the controller 20 determines the input from the user as a selection of the preferences icon 212 and controls the graphical user interface 30 to display the preferences menu screen 34 at step 514. At step 516, the user may select the Microclimate button 310. Then, at step 518, the controller 20 determines the input from the user as a selection of the Microclimate button 310 and controls the graphical user interface 30 to display the Microclimate On/Off Function screen 36 where the user may decide whether to enable or disable control of the MCM system 50 via the home screen 32 at step 520. If the user decides to enable control, or turn control of the MCM system 50 on, the user may select the Selectable button 38 at step 522. The controller 20 determines the input from the user as a selection of the Selectable button 38. To complete the selection, the user may select the Accept button 332 at step 524. The controller 20 determines the input from the user as a selection of the Accept button 332 and the interaction may end. Now, the controller 20 is configured to receive control input from the user at the home screen 32 that the controller 20 can interpret to adjust the settings of the MCM system 50, which may include activation of the MCM system icon 208. When the interaction ends, the controller 20 may control the graphical user interface 30 to return to, or display, the home screen 32 and step 510. If the user decides to disable control, or turn control of the MCM system 50 off, the user may select the Set to Always On button 40 at step 526. The controller 20 determines the input from the user as a selection of the Set to Always On button 40. To complete the selection, the user may select the Accept button 332 at step 528, the controller 20 determines the input from the user as a selection of the Accept button 332 and the interaction may end. When the interaction ends, the controller 20 may control the graphical user interface 30 to return to, or display, the home screen 32 and step 510. Now, a user cannot provide control input to the controller 20 at the home screen 32 that the controller 20 can interpret to adjust the settings of the MCM system 50.

While the method 500 has been described including steps 510-528, it is within the scope of the disclosure to include additional or fewer steps for enabling or disabling control of the MCM system 50. For example, steps 524 and 528 in which the user selects the Accept button 332 to complete the selection may not be included. Furthermore, there may be additional buttons for selection by the user prior to accessing the Microclimate On/Off Function screen 36 at step 518. For example, a Mattress Features screen and corresponding input controls may be displayed by the graphical user interface 30 and configured to receive user input to the controller 20 prior to the graphical user interface 30 displaying and allowing user access to the Microclimate On/Off Function screen 36 at step 518.

According to one aspect of the present disclosure, a patient support apparatus includes an actuator configured to selectively transfer a fluid, a mattress having a cavity configured to receive the fluid, a graphical user interface, and a controller configured to control the actuator and communicate with the graphical user interface. The controller controls the graphical user interface to selectively display: a first screen including a menu section, the menu section including a plurality of icons, the icons including a function setting input and a second screen accessible via the function setting input, wherein the second screen includes at least one control selection input. In response to a first input to the at least one control selection input, the controller responds by enabling a control input at the first screen, wherein the control input is configured to control a setting of the actuator. In response to a second input to the at least one control selection input, the controller responds by controlling a suppression of the control input at the first screen.

According to another aspect of the present disclosure, the actuator includes one of a blower and pump and the controller controls the activation of the one of the blower and pump to transfer the fluid at a predetermined flow rate.

According to yet another aspect of the present disclosure, the controller is further configured to: detect a remote device within a proximity of the patient support apparatus, and in response to the detection, withdraw the suppression thereby enabling the control input on the first screen.

According to yet another aspect of the present disclosure, the controller is further configured to: in response to the remote device outside the proximity of the patient support apparatus maintain the suppression of the control input on the first screen.

According to yet another aspect of the present disclosure, the controller is in communication with a remote device and the remote device is configured to instruct the controller to remotely control the actuator.

According to yet another aspect of the present disclosure, the second screen includes a microclimate activation and deactivation function screen.

According to yet another aspect of the present disclosure, in response to a the first input to the at least one control selection input, the controller responds by enabling the control input to communicate an instruction to the controller, wherein the instruction instructs the controller to control at least one setting of the actuator.

According to yet another aspect of the present disclosure, in response to the second input to the at least one control selection input, the controller responds by suppressing the control input from communicating the instruction to the controller.

According to yet another aspect of the present disclosure, wherein the control input is configured to instruct the controller to control the actuator to adjust a setting of a microclimate control management system.

According to another aspect of the present disclosure, a patient support apparatus includes a mattress configured to receive a fluid from a pneumatic system, a graphical user interface, and a controller configured to control the pneumatic system and to communicate with the graphical user interface. The controller controls the graphical user interface to selectively display: a home screen including a plurality of icons, the icons including a mattress function menu icon and a mattress function screen accessible via the mattress function menu icon. The mattress function screen includes at least one control input configured to activate a first state and a second state of the controller. In the first state, the controller is configured to display and enable a user input at the home screen, wherein in response to the user input, the controller performs an instruction configured to adjust a setting of the pneumatic system. In the second state, the controller is configured to suppress the display of and disable the user input at the home screen.

According to another aspect of the present disclosure, the pneumatic system includes an actuator and the controller controls the actuator to transfer the fluid at a predetermined rate.

According to yet another aspect of the present disclosure, the controller is configured to respond to the instruction according to the user input at the home screen by adjusting the setting of the pneumatic system.

According to yet another aspect of the present disclosure, the controller is configured to suppress the instruction such that control of the setting of the pneumatic system is not accessible via the home screen.

According to yet another aspect of the present disclosure, the controller controls a microclimate management (MCM) system to remain activated.

According to another aspect of the present disclosure, a patient support apparatus includes a pneumatic system configured to control a transfer of a fluid, a mattress configured to receive the fluid, a graphical user interface configured to accept a user input, and a controller configured to control the pneumatic system to control the transfer of the fluid at a flow rate and to communicate with the graphical user interface. The controller controls the graphical user interface to selectively display a first screen including a first set of icons, a second screen including a second set of icons, and monitor the graphical user interface for the user input. In response to a predetermined amount of time elapsed following the user input, the controller controls the graphical user interface to display the second screen.

According to another aspect of the present disclosure, wherein the controller is configured to detect a remote device within a proximity of the patient support apparatus and display the second screen in response to the remote device within the proximity.

According to yet another aspect of the present disclosure, the first set of icons and the second set of icons each include a function control icon, wherein the function control icon displayed in the second set of icons is at least 50% larger than the function control icon displayed in the first set of icons.

According to yet another aspect of the present disclosure, the first set of icons and the second set of icons each include a microclimate management (MCM) system icon.

According to yet another aspect of the present disclosure, the MCM system icon includes one of a MCM "on" indicator icon and a MCM "off" indicator icon.

According to yet another aspect of the present disclosure, the second set of icons is visibly discernable by a human having naked eye normal acuity from at least three meters away.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The various illustrative logical blocks, modules, controllers, and circuits described in connection with the embodiments disclosed herein may be implemented or performed with application specific integrated circuits (ASICs), field programmable gate arrays (FPGAs), general purpose processors, digital signal processors (DSPs) or other logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A patient support apparatus comprising:

an actuator configured to selectively transfer a fluid;

a mattress having a cavity configured to receive the fluid;

a graphical user interface; and a controller configured to control the actuator and communicate with the graphical user interface, wherein the controller controls the graphical user interface to selectively display:

a first screen including a menu section, the menu section comprising a plurality of icons, the icons comprising a function setting input; and a second screen accessible via the function setting input, wherein the second screen includes at least one control selection input, wherein:

in response to a first input to the at least one control selection input, the controller responds by enabling a control input at the first screen, wherein the control input is configured to control a setting of the actuator; and wherein in response to a second input to the at least one control selection input, the controller responds by controlling a suppression of the control input at the first screen.

2. The patient support apparatus of claim 1, wherein the actuator comprises one of a blower and pump and the controller controls the activation of the one of the blower and pump to transfer the fluid at a predetermined flow rate.

3. The patient support apparatus of claim 1, wherein the controller is further configured to:

detect a remote device within a proximity of the patient support apparatus, and in response to the detection, withdraw the suppression thereby enabling the control input on the first screen.

4. The patient support apparatus of claim 3, wherein the controller is further configured to:

in response to the remote device outside the proximity of the patient support apparatus maintain the suppression of the control input on the first screen.

5. The patient support apparatus of claim 1, wherein the controller is in communication with a remote device and the remote device is configured to instruct the controller to remotely control the actuator.

6. The patient support apparatus of claim 1, wherein the second screen comprises a microclimate activation and deactivation function screen.

7. The patient support apparatus of claim 1, wherein in response to a the first input to the at least one control selection input, the controller responds by enabling the control input to communicate an instruction to the controller, wherein the instruction instructs the controller to control at least one setting of the actuator.

8. The patient support apparatus of claim 7, wherein in response to the second input to the at least one control selection input, the controller responds by suppressing the control input from communicating the instruction to the controller.

9. The patient support apparatus of claim 6, wherein the control input is configured to instruct the controller to control the actuator to adjust a setting of a microclimate control management system.

* * * * *